E. B. BUEHLER.
STALK CUTTER.
APPLICATION FILED MAR. 30, 1911.

1,006,462.

Patented Oct. 24, 1911.

Witnesses

Inventor
Ernest B. Buehler,
by Frank Aanenson
Attorney

UNITED STATES PATENT OFFICE.

ERNEST B. BUEHLER, OF GREENVILLE, MISSISSIPPI.

STALK-CUTTER.

1,006,462.　　　　Specification of Letters Patent.　　Patented Oct. 24, 1911.

Application filed March 30, 1911. Serial No. 618,025.

*To all whom it may concern:*

Be it known that I, ERNEST B. BUEHLER, a citizen of the United States of America, and resident of Greenville, in the county of Washington and State of Mississippi, in the United States of America, have invented certain new and useful Improvements in Stalk-Cutters, of which the following is a specification.
This invention relates to devices for cutting cotton stalks and for gathering the same, and the invention relates more particularly to a cutter in which knives act on the stalk near the roots thereof where they are comparatively rigid and offer resistance sufficient to prevent bending.

An object of this invention is to provide a stalk cutter having novel means for guiding the same and preventing lateral movement thereof whether the resistance of the two sides of the cutter be equal or not, thus insuring the retention of the blades of the cutter in proper relation to the rows of stalks to be cut, such action resulting without undue effort on the part of the operator.

A still further object of this invention is to provide a stalk cutter in which the knives are readily removable for the purpose of repairing or renewing the same and in which the frame of the cutter to which the knives are attached is of such rigid construction as to readily withstand the strain incident to the use of the said cutter.

With the foregoing and other objects in view, the invention consists in the details of construction and the arrangement and combination of parts to be hereinafter more fully set forth and claimed.

In describing the invention in detail, reference will be had to the accompanying drawings forming part of this specification wherein like characters denote corresponding parts in the several views, in which—

Figure 1:
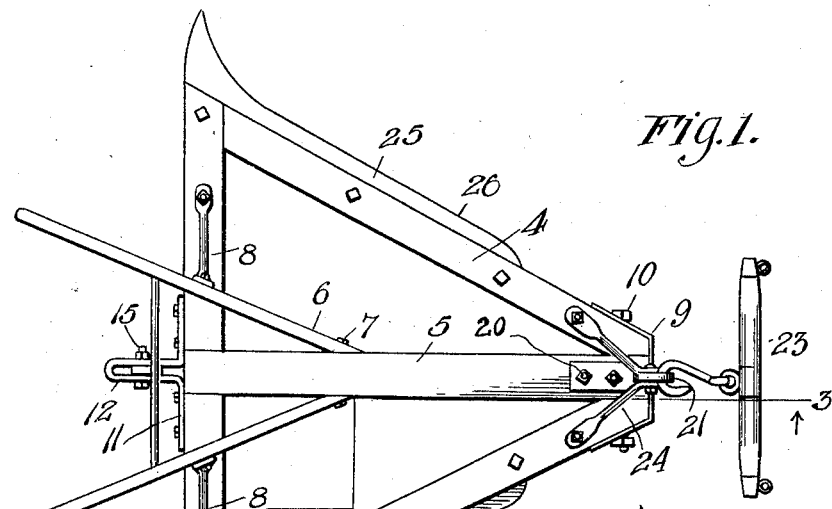
Figure 2:
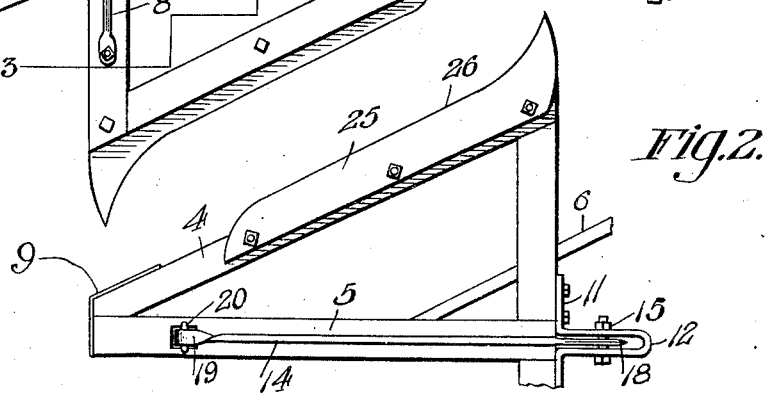
Figure 3:
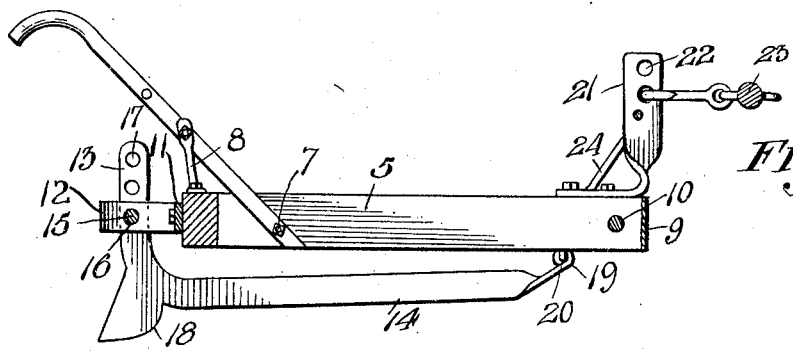

Figure 1 illustrates a top plan view of a stalk cutter embodying the invention; Fig. 2 illustrates an underneath plan view of a fragment thereof; and Fig. 3 illustrates a sectional view on the line 3—3 of Fig. 1.

One embodiment of the invention, here illustrated, comprises a substantially triangular frame 4 having a central beam 5 to which the ends of the handle 6 are connected by the bolts 7, the said handles being connected to braces 8 which rest on the frame 4.
The sections comprising the frame are bound together at the front end by a metal strap 9 held in place by a bolt 10. The rear of the frame is provided with a guide bar comprising a plate having portions 11 secured to the rear edge of the frame, the said plate being provided with a loop 12 in which the upwardly disposed extension 13 of the guide bar 14 is adjusted and held at different positions by a securing device which may be in the form of a bolt 15 run through apertures such as 16 in the plate and through apertures 17 in the upwardly extending portion 13.

The guide bar 14 has a fin 18 near the rear end thereof, which fin extends below the edge of the bar and is utilized to guide the frame and prevent side wise dislodgment thereof under the strain incident to the cutting action of the chopper. The forward end of the bar 14 is provided with an eye 19 which is engaged by the bolt 20 secured in the central beam 5.

The forward end of the frame is provided with a draft iron 21, the standard of which is provided with apertures 22 in order that the single-tree 23 may be connected to the draft iron at different positions vertically, and the said draft iron is provided with braces 24 which are anchored to the frame.

The knives 25, here shown, have their cutting edges 26 substantially parallel with the edges of the frame except that in the rear thereof they curve outwardly and rearwardly in order to present cutting surfaces which lie more nearly at right angles to the direction of travel of the cutter to insure a proper severance of the stalk.

I claim:

1. In a cotton stalk cutter, a frame, detachable cutting blades secured to the under side of the frame and having their cutting edges extending beyond the edges of said frame, the rear portion of said blades curving outwardly and rearwardly, a guide bar, said guide bar having one of its ends pivoted to the under side of the frame and means for adjusting the said guide bar.

2. In a cotton stalk cutter, a frame, detachable cutting blades secured to the under side of said frame and having their cutting edges extending beyond the edges of said frame, the rear portion of said blades curving outwardly and rearwardly, an adjustable guide bar, said guide bar having its forward end provided with an eye, and having its forward end pivoted under the forward end of the frame, an integral fin provided on the under side of the guide bar near the rear end thereof, an upwardly extending portion provided on the rear of the guide bar and directly over the fin, and a guide for guiding the said upwardly projecting member, said guide comprising a substantially U-shaped member, and means for holding said guide bar in its positions of adjustment.

In testimony whereof I have hereunto affixed my signature in the presence of two witnesses.

ERNEST B. BUEHLER.

Witnesses:
SAM MONTGOMERY,
B. B. BAUMGARDEN.

Copies of this patent may be obtained for five cents each, by addressing the "Commissioner of Patents, Washington, D. C."